May 5, 1936.  A. P. FERGUESON  2,039,786
SPARE TIRE COVER
Filed Nov. 16, 1933   3 Sheets—Sheet 1
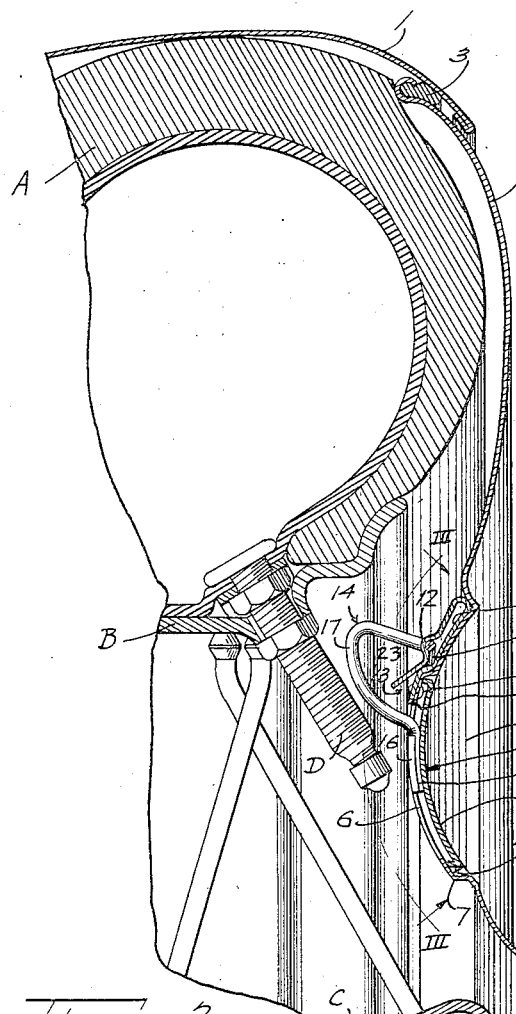
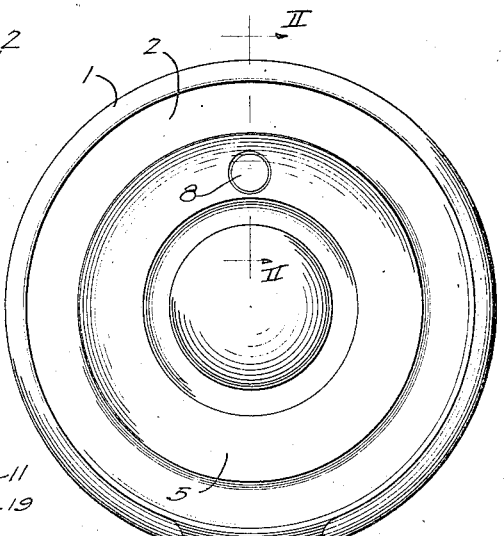
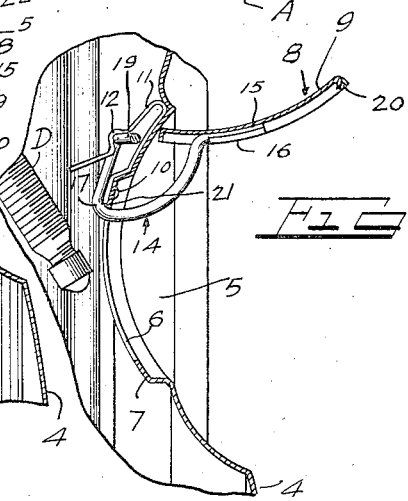
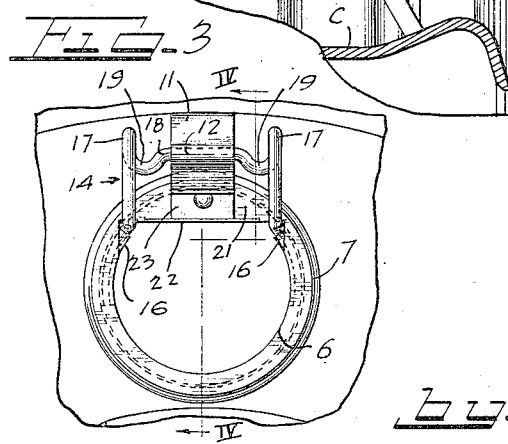
Inventor
ARTHUR P. FERGUESON.
by: Attys.

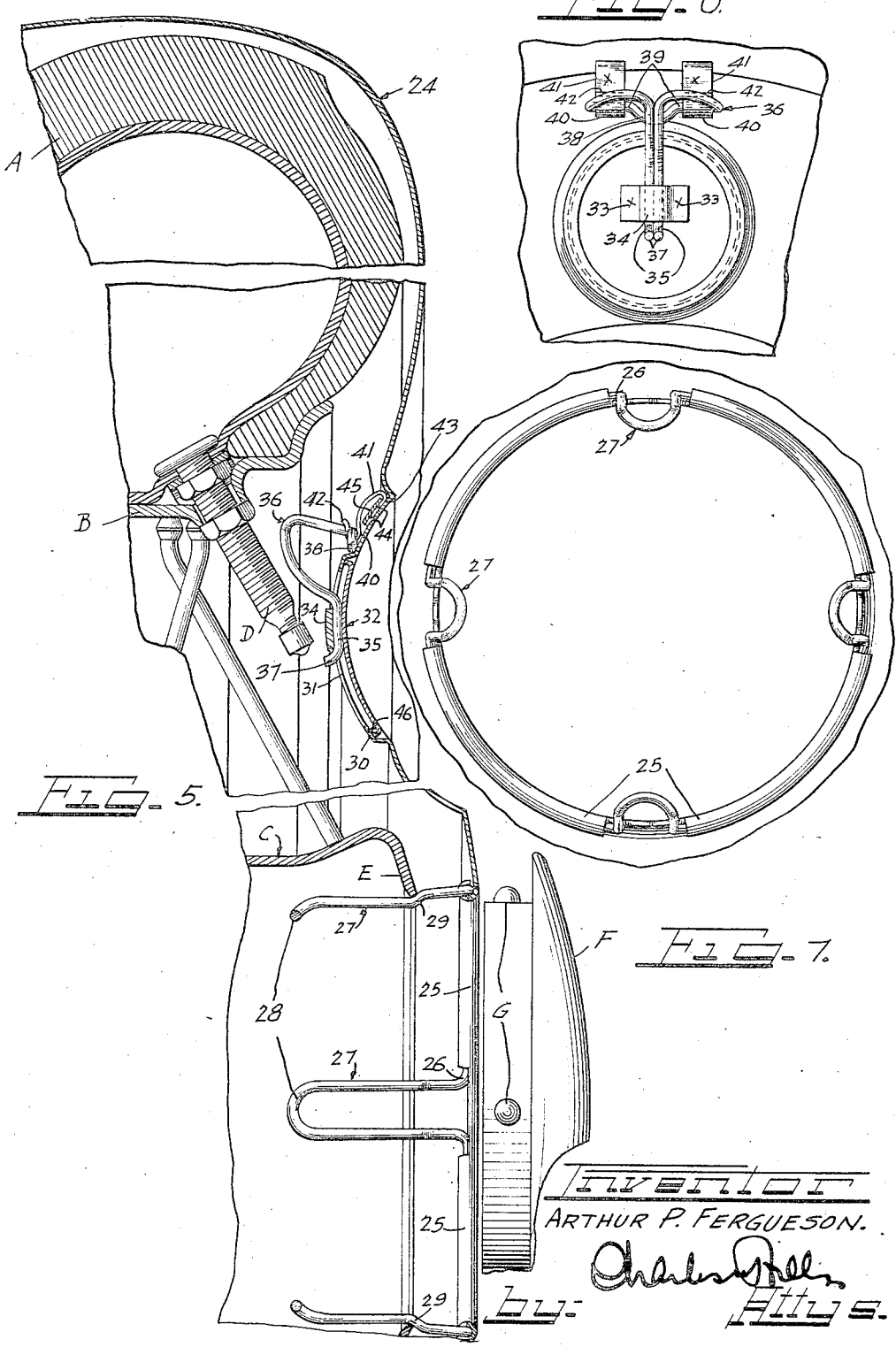

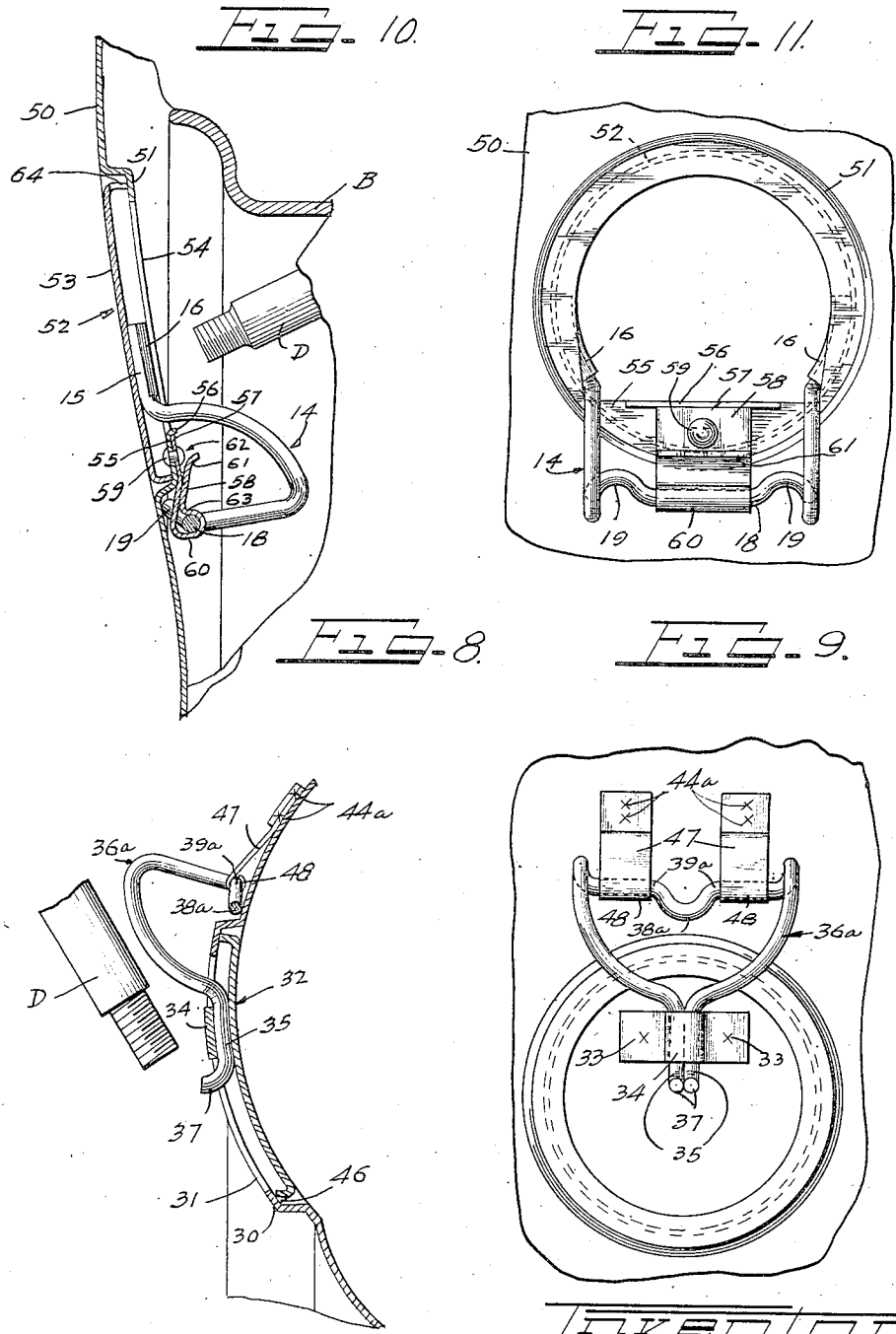

Patented May 5, 1936

2,039,786

UNITED STATES PATENT OFFICE 2,039,786

SPARE TIRE COVER

Arthur P. Fergueson, Detroit, Mich., assignor to Lyon Cover Company, Detroit, Mich., a corporation of Michigan Application November 16, 1933, Serial No. 698,259

15 Claims. (Cl. 150—54)

This invention has to do with tire covers.

It is an object of the invention to provide a tire cover construction embodying means for covering substantially the entire outer side of a spare wheel and tire, yet embodying means rendering the tire valve accessible without requiring removal of the cover.

It is a further object of the invention to provide a tire cover side plate of the drum type with means mounted upon the side thereof and arranged to be held automatically in closed or open position, as desired, for selectively providing and precluding access to the tire valve.

It is a further object of the invention to provide in the side of a drum type wheel and tire cover, a door arranged to be located in juxtaposition to the free end of a tire valve and arranged to be held by over-center or toggle mechanism selectively in open and closed positions.

It is still another object of the invention to provide a drum type tire cover having a cross-sectional shape conforming generally to that of a spare wheel and tire mounted thereon, and embodying means rendering the tire valve readily accessible, said means being formed so as to harmonize with the remainder of the cover.

In accordance with the general features of the invention, the tire cover construction embodying the invention is preferably of the drum type so as to conceal the spare wheel and tire on one side, and is provided with a closure located so as to be positioned in front of the protruding end of the spare tire valve. The closure covers an opening in the cover and is releasably and yieldably held in closed or open position, as desired, by a spring controlled over-center or toggle mechanism to which the closure is connected. Said mechanism is preferably mounted on the inner side of the cover and the latter is preferably depressed so that when the closure is in closed position, its outer surface constitutes substantially a continuation of the surrounding surface of the cover from the outside thereof, so that the aesthetic effect of the outer surface of the cover as a whole is substantially unimpaired.

The invention is embodied in different forms which will be hereinafter fully described.

The cover may be formed with a central opening to receive a hub cap and with spring guiding and holding means for holding the cover in substantially coaxial relation to the spare wheel and tire.

Further objects and advantages of the invention will appear as the description proceeds.

On the drawings:

Figure 1 is an elevational view of the invention mounted on a spare wheel and tire.

Figure 2 is a fragmentary, enlarged sectional view taken substantially in the plane designated by the line II—II in Figure 1, certain parts being shown for convenience in elevation.

Figure 3 is a fragmentary rear elevational view taken substantially as indicated by the line III—III in Figure 2.

Figure 4 is a fragmentary sectional view taken substantially in the planes designated by the line IV—IV in Fig. 3.

Figure 5 is an enlarged fragmentary sectional view of a modified form of tire cover and closure construction.

Figure 6 is a view similar to that of Figure 3 but showing the modified closure construction of Figure 5.

Figure 7 is a fragmentary rear elevational view of the tire cover centering and supporting means of Figure 5.

Figure 8 is a fragmentary sectional view of a somewhat further modified form of the invention.

Figure 9 is a rear elevational view of the closure structure of Figure 8.

Figure 10 is a fragmentary sectional view of another modification of the invention, wherein the closure is opened by being swung downwardly instead of upwardly.

Figure 11 is a fragmentary rear elevational view of the structure shown in Figure 10.

Referring now more particularly to the drawings, the tire cover shown in conjunction with the modifications of Figures 1 to 4 inclusive comprises a preferably resilient split rim or tread covering member 1 and a drum type side plate 2 formed to conceal the entire outer or front side of the tire A and spare wheel B. A cushion strip 3 carried by the member 2 so as to prevent metal to metal contact between the same and the member 1 is preferably provided. The member 1 serves not only to hold itself in proper position on the tire, but to also hold the side member 2 in substantially coaxial relation to and against the tire as shown, said member 1 being expansible in order to enable the same to be removed and thus allow the side member 2 to be removed.

It will be observed that the members 1 and 2 are so shaped in cross-section as to substantially correspond to the shape of the spare wheel and tire so as to simulate the same when mounted thereon. The side plate 2 is accordingly bulged centrally at 4 to accommodate the protruding portion of the hub C of the spare wheel, and is formed intermediate its central and tire covering portion with an annular depressed portion 5 preferably arranged to be positioned adjacent the free end of the tire valve D.

The means about to be described for affording access to the valve D without necessitating removal of the tire cover is shown in Figures 1, 2, 3 and 4 as applied to a tire cover construction embodying a plurality of parts as described. It is to be understood, however, that said means is entirely independent of the number of parts comprising the tire cover, and is therefore as applicable to a cover of the character shown in Figures 1 and 2 as to a single piece tire cover, for example, or any other tire cover construction which embodies a side portion such as shown in these figures.

In the form of the invention shown in Figures 1 to 4, inclusive, a portion of the depressed part 5 in preferably the general shape of a circle is provided with an opening 6 and bulged or depressed at 7 to receive a closure 8. The opening 6 and depressed portion 7, while shown to be substantially circular, are so shaped merely for convenience, and may be rectangular or otherwise shaped if desired.

The depth of the depression 7 is preferably equal to the corresponding dimension of the closure 8 so that when the latter, which preferably substantially fills the depression 7, is positioned therein so as to conceal the opening 6 and engage the bottom of the depression 7, the outer concave surface 9 constitutes substantially a continuation of the depressed part 5.

It will be understood that it is not necessary that the closure 8 be formed in a depression in the tire cover, and that it is so disclosed herein for illustrative purposes only.

Secured to the bottom of the depression 7 as by a rivet 10, spot-welding or other suitable means, is a spring 11 which extends preferably radially from the place of securement substantially beyond the depression, is then bent upon itself, formed with a rearwardly extending kink 12, engages itself inwardly of the kink and then has its ends in divergent relationship, as at 13. The spring 11 is formed so as to maintain said engagement yieldably.

For the purpose of anchoring the closure 8 to the spring 11, a generally U-shaped bail 14 is provided. The free ends 15 of the bail 14 are preferably shaped to conform with the periphery of the closure 8 and are secured thereto by ears 16 extending inwardly from and bent about the ends 15 so as to embrace the same as shown in Figures 2, 3, and 4. Each arm 17 of the bail 14, between its end 15 and the bight 18 of the bail, is generally V-shaped in a plane substantially normal to the general direction of the bight 18. The bight 18 is formed with a straight central portion and kinked end portions 19. The straight portion, when the bail is to be assembled with the spring 11, is placed in the space 13 between the ends of the spring 11 and forced outwardly so as to be snapped into the kink 12 of the spring, as shown in Figures 2, 3 and 4. The kinks 19 of the bail 14 have an eccentricity relative to the straight portion of the bight 18 in excess of the distance of the kink 12 of the spring from the opposite side of the spring, when the spring is closed or substantially closed, and the kinks 19 extend from the straight portion of the bight 18 at such an angle that, when said kinks 19 are disposed on one side of dead center relative to the spring 11, the closure 8 is in closed position as shown in Figures 2 and 3, and when said kinks 19 are on the other side of dead center, the closure 8 is yieldably held in open position as shown in Figure 4. The kinks 19 engage the rear surface of the depression 5 in straddling relation to the spring 11. The opening movement of the closure 8 is terminated upon engagement of the arms 17 with the bottom of the depressed portion 7 as shown in Figure 4.

The spring 11 thus serves to yieldably hold the closure 8 selectively in closed and open positions. The spring pressure is preferably sufficiently great to prevent accidental removal of the bail 14 therefrom, and to hold the closure 8 so as to prevent rattling between the same and the tire cover member 2. Movement of the closure 8 from closed position may be initiated by placing the finger nail or any appropriate instrument, such as a nail, key, screw driver or the like behind the outer peripheral edge as at 20 of the closure 8 and pulling outwardly on the same sufficiently to cause the kinks 19 to pass dead center relative to the spring 11. To facilitate this, the closure 8 may be formed with an acutely extending flange portion or may be cut away to provide a slot or opening, preferably substantially diametrically opposite the spring 11.

When the closure 8 is in closed position, it entirely conceals the opening 6, the rivet 10, spring 11 and bail 14. When the closure 8 is in open position as shown in Figure 4, the opening 6 is revealed, and said opening is of such size as to reveal the free end of the tire valve D, rendering the same readily accessible to the hand so that the valve may be readily connected to a source of air supply without necessitating removal of the tire cover.

The tire cover parts 1 and 2 are preferably made of sheet material, sheet metal having been found to be efficacious. The closure 8 may be formed of like sheet material if desired, or may be made of any other suitable material, such as hard rubber, phenolic condensation products or the like. The spring 11 is preferably a leaf spring, and may be made of spring metal, rubber or other material having the desired resilient characteristics. The bail 14 is preferably stiff and made of wire, although the same may take other forms and be made of different materials, so long as it functions the same as that designated 14 in Figures 1 to 4, inclusive.

It will be observed that the bottom of the depression 7, at the end adjacent the spring 11, is formed with a segment 21 provided with a ledge 22 which substantially abuts the substantially straight edge of the secured end 23 of the spring 11, thereby cooperating with the securing means 10 in preventing dislocation of the spring.

A somewhat modified closure and associated structure is shown in Figures 5 and 6 in conjunction with a one-piece tire cover 24, although insofar as the said structure is concerned, as pointed out hereinabove, it is immaterial whether the cover be formed in one piece or a plurality of pieces. In Figures 5 and 7, the cover 24 is shown to extend substantially to the hub C, and has anchored thereto at 25 a centering and holding means in the form of a continuous or substantially continuous ring 26 having a plurality of substantially U-shaped rearwardly offset portions 27 which are bent inwardly toward the axis of the ring at their bights 28. The portions 27 are formed with shoulders 29 and are preferably resilient so as to yieldably engage the front end E of the hub C. The portions 28 thus serve to readily center the cover relative to the spare wheel and tire, and the portions 27 serve to resiliently hold the cover in centered relation to the spare wheel and tire so that rattling is prevented. Any suitable means, not shown, may be provided for holding the cover against accidental removal from the tire.

The hub cap F, which is formed to be releasably interlocked with the front part E of the hub C, through its spring pressed latches G, cooperates with the tire cover 24 so as to be releasably mounted thereon.

The means for rendering the tire valve D accessible in Figure 5 without necessitating removal or disturbance of the cover 24 includes a depressed portion 30 similar to the depressed portion 7 of the previously described form of the invention and provided with a preferably circular opening 31. A closure 32 similar to the previously described closure 8 and cooperating with the depressed portion 30 in the same way in which the closure 8 cooperates with the depression 7 of the previously described form of the invention, has secured thereto as by spot-welding 33, riveting or the like, a channeled anchoring element 34 through which pass the adjacent ends 35 of a bail 36. The extremities 37 of the bail 36 are turned up, as are also the portions of the bail on the side of the element 34 opposite said extremities, so as to interlock the bail with the element and consequently with the closure or cap 32.

It will be observed that the bail 36 is similar in form to the bail 14, except that the ends 35 are close together and the bail 36 at its bight is formed with straight end portions 39 and an intermediate kink 38 instead of a straight intermediate portion and kinked ends 19 as in Figures 2 to 4, inclusive. The straight portions 39 are rotatably carried by spaced spring bearings 40 formed in the leaf springs 41. The ends 42 of the springs 41 are bent sufficiently to preclude accidental removal of the straight portions 39 from the bearings 40 and are curved outwardly to enable said straight portions to be guided into said bearings when the parts are assembled. The springs 41 are preferably securely fastened to the cover 24 at their ends 43 opposite the ends 42 as by spot-welding 44, riveting or the like with preferably the use of an anchor element 45.

The springs 41 are so arranged that they constantly urge the kink 38 toward the cover 24 as shown in Figure 5, wherein, by virtue of this function of the springs 41, the closure 32 is held in closed position. The closure 32 is formed with an acute bend at 46 to provide a recess for the reception of a finger-nail, fastening nail, screw driver or like instrument for enabling the closure or cap 32 to be pulled forwardly so as to cause the bail 36 to swing until the kink 38 passes upwardly beyond dead center to a position where the closure 32 will be held in open position as shown in Figure 4 in connection with the previously described form of the invention.

The form of the invention appearing in Figures 8 and 9 is similar to that shown in Figures 5 and 6, differing therefrom essentially in the details of the springs. In Figures 8 and 9, the springs 47 are curled upon themselves to provide relatively permanent bearings 48 for the straight portions 39a of the bail 36a. Accordingly, portions of the structure of Figures 8 and 9 which are substantially identical with corresponding portions of the form of the invention shown in Figures 5 and 6 are numbered likewise.

The intermediate kink 38a of the bail 36a is shown in Figure 8 in the position which it occupies and is held by the springs 47 when the cap 32 is in closed position. The kink 38a will occupy a position corresponding to that occupied by the kinks 19 in Figure 4 when the cap 32 is in open position.

In Figures 10 and 11 is shown a modification somewhat similar to that shown in Figures 1 to 4, inclusive, differing therefrom essentially in the spring structure and in the fact that the cap or closure opens downwardly instead of upwardly. In this modified form, the side portion 50 of the tire cover is formed with a depressed portion 51 in which the cap 52 is so received that the exposed surface 53 of the cap constitutes a substantial continuation of the exposed outer surface of the cover side portion 50. The depressed portion 51 is formed with an opening 54 which is preferably substantially circular and spaced from the center of the cover portion 50 to such an extent that it may be located in front of and thus render accessible the tire valve D from outside of the cover without requiring removal of the cover.

The inner part of the depressed portion 51 at 55 extends toward the outer part and is formed with a lip 56 which substantially abuts an end portion 57 of a leaf spring 58, permanently secured to the portion 55 by any suitable means, such as the rivet 59. The rivet 59 and cooperating portions of the lip 56 and spring 58 thus prevent dislocation of the spring relative to the cover side part 50.

The spring 58 extends inwardly and is bent upon itself to form a substantially closed loop 60 in which the straight intermediate portion 18 of the bail 14 is rotatably received. The loop 60 is so arranged with respect to the adjacent portion of the cover 50 as to hold the kinks 19 yieldably on one or the other side, selectively, of the shortest distance between said loop and the cover. The cooperation is in effect substantially the same as that of the corresponding structure of the previously described forms of the invention.

The free end 61 of the spring 58 is turned away from the secured end 57 thereof to provide a substantially V-shaped entrance 62 whereby assembly of the bail 14 with the spring 58 is facilitated. The loop 60, it will be observed, provides an abutment portion 63 which is effective both when the cap 52 is in closed and in open position to effectively resist accidental withdrawal of the bail 14 from the spring 58.

The ends 15 of the bail 14 are secured to the closure 52 by means of ears 16 as clearly described in connection with the form of the invention appearing in Figures 1 to 4, inclusive. To facilitate grasping of the cap 52 so that the same may be swung open sufficiently to cause the kinks 19 to snap onto the other side of dead center, the cap 52 may be cut away at any suitable place such as at 64 for the reception of a finger-nail, screw driver or the like. If desired, instead of cutting away any of the material for this purpose, the cap 52 may be formed with an acutely bent portion as shown in other forms of the invention herein described.

It will be seen from the foregoing that the invention in its various forms is extremely simple, since it involves parts which may be formed with simple manufacturing operations at low cost, may be very easily assembled with each other and with the tire cover, is susceptible of use with either a one-piece or a multi-part tire cover embodying a side plate of generally drum shape, and provides a simple means whereby the tire valve is made accessible without necessitating removal of the tire cover. The cap or closure may be finished the same as the associated part of the cover, or if desired the same may be differently ornamented or have the initials of the owner of the car, for example, inscribed thereon.

When the cover is placed upon the tire, the cap is preferably in open position so that the same may be aligned or placed in register with the free end of the valve. In the form of the invention shown in Figures 1 to 4, inclusive, the side plate 2 would be so positioned, and the retaining rim 1 thereafter placed in position as shown in Figures 1 and 2. Any time after the side plate 2 is in position, the cap or closure 15 may be snapped into closed position as shown in Figures 1, 2 and 3. In the form of the invention shown in Figure 5, wherein a one-piece cover 24 is illustrated, by snapping the closure or cap 32 to open position, the cover 24 may be so positioned on the tire and wheel as to locate the opening 31 adjacent the free end of the valve D. Then the cover may be secured in any desired manner in proper tire and wheel protecting position, and the cap closed whenever desired.

The spring fingers 27 are spaced apart diametrically adjacent the disc 24 to provide clearance for the collar of the hub cap F so that the latter may be mounted on the disc. The shoulders 29 may contact the hub E as shown or may be spaced from the same.

I am aware that many changes may be made and numerous details of construction may be varied without departing from the principles of this invention, and I, therefore, do not purpose limiting the patent granted hereon otherwise than is necessitated by the prior art.

I claim as my invention:

1. In a side plate formed to cover substantially the entire outer side of a spare wheel and having an opening arranged so that it may be located substantially in front of the spare tire valve to render the same accessible from the front side of the plate without necessitating removal of the plate, a closure for said opening, and resilient means supporting said closure from the plate selectively in open and closed positions.

2. In a plate member formed to cover substantially the entire outer side of a spare wheel and having an opening arranged so that it may be located substantially in front of the spare tire valve to render the same accessible from the front side of the plate member without necessitating removal of the plate member, a closure member for said opening, spring means carried by one of said members, and anchor means connecting the other member to said spring means and having a snap-over association with said spring means so as to yieldably hold the closure member selectively in open and closed positions.

3. In a plate member formed to cover substantially the entire outer side of a spare wheel and having an opening arranged so that it may be located substantially in front of the spare tire valve to render the same accessible from the front side of the plate member without necessitating removal of the plate member, a closure member for said opening, spring means carried by one of said members, and anchor means connecting the other member to said spring means so as to yieldably hold the closure member selectively in open and closed positions, said anchor means and spring means being disposed on the rear side of the plate member and said plate member having a depression for the closure member so that the plate member is substantially unobstructed when the closure member is in closed position.

4. In a side plate formed to cover substantially the entire outer side of a spare wheel and having an opening arranged so that it may be located substantially in front of the spare tire valve to render the same accessible from the front side of the plate member without necessitating removal of the plate, a closure for said opening and arranged to swing in front of the plate to open and closed positions, and means including spring means for holding said closure selectively in open and closed positions, said spring means being disposed on the rear side of the plate and said plate having a depression for the closure so that the plate is substantially unobstructed when the closure is in closed position.

5. In a plate member formed to cover substantially the entire outer side of a spare wheel and having an opening arranged so that it may be located substantially in front of the spare tire valve to render the same accessible from the front side of the plate member without necessitating removal of the plate member, a closure member for said opening, spring means carried by one of said members, and anchor means connecting the other member to said spring means and having a snap-over association with said spring means so as to yieldably hold the closure member selectively in open and closed positions, said anchor means being substantially rigidly connected to said closure member so as to swing said closure member bodily in its movement to and from closed position.

6. In a plate member formed to cover substantially the entire outer side of a spare wheel and having an opening arranged so that it may be located substantially in front of the spare tire valve to render the same accessible from the front side of the plate member without necessitating removal of the plate member, a closure member for said opening, spring means carried by one of said members, and anchor means connecting the other member to said spring means and having a snap-over association with said spring means so as to yieldably hold the closure member selectively in open and closed positions, said anchor means comprising relatively offset portions engaged by said spring means and plate member respectively and urged toward the latter by said spring means.

7. In a side plate formed to cover substantially the entire outer side of a spare wheel and having an opening arranged so that it may be located substantially in front of the spare tire valve to render the same accessible from the front side of the plate without necessitating removal of the plate, a closure for said opening, and guiding and centering means carried by the plate and arranged to cooperate with the spare wheel whereby to guide and center the plate as the same is assembled with the spare wheel so as to assist in locating the opening in front of the spare tire valve.

8. In a side plate formed to cover substantially the entire outer side of a spare wheel and having an opening arranged so that it may be located substantially in front of the spare tire valve to render the same accessible from the front side of the plate without necessitating removal of the plate, a closure for said opening, and guiding and centering means carried by the central part of the plate so as to cooperate with the wheel hub whereby to guide and center the plate as the same is assembled with the spare wheel so as to assist in locating the opening in front of the spare tire valve.

9. In a side plate formed to cover substantially the entire outer side of a spare wheel and having an opening arranged so that it may be located substantially in front of the spare tire valve to render the same accessible from the front side of the plate without necessitating removal of the plate, a closure for said opening, and guiding and centering means carried by the central part of the plate so as to cooperate with the wheel hub whereby to guide and center the plate as the same is assembled with the spare wheel so as to assist in locating the opening in front of the spare tire valve, said means affording clearance for the collar of a hub cap to be mounted on the plate.

10. In a side plate formed to cover substantially the entire outer side of a spare wheel and having an opening arranged so that it may be located substantially in front of the spare tire valve to render the same accessible from the front side of the plate without necessitating removal of the plate, a closure for said opening and arranged to swing in front of the plate to open and closed positions, and means including spring means for holding said closure selectively in open and closed positions.

11. In a cover for a spare wheel and tire including a plate formed to cover the front of the spare wheel and tire and provided with an opening arranged to be located so as to expose the tire valve stem from the front when the plate is in proper wheel and tire covering position, a closure for said opening and arranged to be swung in front of the plate in its movement to open and closed positions, and means disposed at the rear of the plate and mounting the closure on the plate whereby said means is shielded from the front of the plate, said means being constructed and arranged to yieldably hold the closure selectively in open and closed positions.

12. In a plate member formed to cover substantially the entire outer side of a spare wheel and having an opening arranged so that it may be located substantially in front of the spare tire valve to render the same accessible from the front side of the plate member without necessitating removal of the plate member, a closure member for said opening, spring means carried by one of said members, and anchor means connecting the other member to said spring means and having a snap-over association with said spring means so as to yieldably support the closure member selectively in open and closed positions, said spring and anchor means affording means constructed and arranged to be operatively assembled by substantially a single relative movement.

13. In a combination including an assembly comprising a wheel support mounted on a vehicle and a wheel and tire removably mounted on the support, a cover comprising a member shaped to shield the outer side of the wheel and having an opening arranged so that it may be located substantially in front of the tire valve to render the same accessible without necessitating removal of said member, a closure for said opening, and guiding and centering means carried by said member and arranged to cooperate with the assembly whereby to guide and center said member as the same is assembled with the assembly so as to assist in locating the opening in front of the valve.

14. In a combination including an assembly comprising a wheel support mounted on a vehicle and a wheel and tire removably mounted on the support, a cover comprising a member shaped to shield the outer side of the wheel and having an opening arranged so that it may be located substantially in front of the tire valve to render the same accessible without necessitating removal of said member, a closure for said opening, and resiliently yieldable guiding and centering means carried by said member and arranged to cooperate with the assembly whereby to guide and center said member as the same is assembled with the assembly so as to assist in locating the opening in front of the valve.

15. In a spare wheel and cover assembly, a wheel including a tire having a valve stem, a cover including a side plate structure having a valve stem opening, and means centrally of said structure for resiliently supporting and centering said side plate structure in the assembly so as to enable alinement of said opening with the valve stem.

ARTHUR P. FERGUESON.